(12) United States Patent
Blick

(10) Patent No.: US 6,186,567 B1
(45) Date of Patent: Feb. 13, 2001

(54) AUTOMATIC CLAMPING AND PLACEMENT HOLDER

(76) Inventor: John Blick, 31891 Circle Dr., S. Laguna, CA (US) 92677

( * ) Notice: Under 35 U.S.C. 154(b), the term of this patent shall be extended for 0 days.

(21) Appl. No.: 09/108,792

(22) Filed: Jul. 2, 1998

(51) Int. Cl.[7] .................................................. B66C 1/66
(52) U.S. Cl. .............................. 294/86.4; 294/88; 294/90
(58) Field of Search .............................. 294/86.4, 88, 90, 294/102.1, 102.2, 86.13, 86.14, 86.15, 86.16, 82.14; 403/353; 269/20, 21, 309, 310

(56) References Cited

U.S. PATENT DOCUMENTS

| | | | |
|---|---|---|---|
| 1,737,029 | * | 11/1929 | Shaffer ................................... 294/90 |
| 1,738,937 | * | 12/1929 | Baker ................................ 294/86.13 |
| 3,043,619 | * | 7/1962 | George et al. ......................... 294/90 |
| 3,520,055 | | 7/1970 | Jannett . |
| 3,537,701 | | 11/1970 | Claycomb . |
| 3,729,185 | | 4/1973 | Roeske . |
| 3,907,268 | | 9/1975 | Hale . |
| 4,793,726 | * | 12/1988 | Sword ................................... 403/353 |
| 4,815,780 | * | 3/1989 | Obrist ................................ 294/86.4 |
| 4,826,230 | * | 5/1989 | Truchet ................................. 294/90 |
| 4,934,672 | | 6/1990 | Craft . |
| 5,203,547 | | 4/1993 | Marumo . |
| 5,562,276 | | 10/1996 | Blick . |

FOREIGN PATENT DOCUMENTS

| | | | |
|---|---|---|---|
| 2393-654 | * | 2/1979 | (FR) . |
| 1636175 | | 3/1991 | (SU) . |

\* cited by examiner

*Primary Examiner*—Dean J. Kramer
(74) *Attorney, Agent, or Firm*—Curtis L. Harrington (57) ABSTRACT

A clamping holder provides both an apparatus and method enabling quick, precise automatic re-positioning of positional devices, particularly useful in edging and milling applications. A clamping holder is capable of automatically approaching, lifting up to surround, engaging and picking up a positioning device, translating to a proper and precise placement location, lowering it into place, disengaging the clamping holder, lowering to provide exit clearance around the positioning device and moving away to either position the next positioning device or to move on to the next task. In addition to this automatic mode, the spindle may also be manually loaded by a worker standing well outside the work area of the main processing machine. A spindle shaped clamping holder has a radial side opening to accept a bearing member and piston support of a locational device. Within the clamping holder is a chamber having a self centering tapered surface to allow the cylindrical shape of the locator bearing member to be exactly centered in the clamping holder when the clamping holder lifts or when the locator downwardly moves within the clamping holder. A single acting, spring opposed, piston clamps down upon the top surface of the cylindrical locator bearing which locks the locator bearing and piston into exact centered alignment with the clamping holder.

17 Claims, 5 Drawing Sheets

AUTOMATIC CLAMPING AND PLACEMENT HOLDER

FIELD OF THE INVENTION

The present invention relates to improvements in the field of holding devices for machines. More specifically, the present invention relates to a device and method which permits automatic lifting and placement of material locator stops to eliminate the need for workers to enter the dangerous work area of a process machine.

BACKGROUND OF THE INVENTION

In many instances, it is necessary to locate a position indicating structure with respect to a work piece which is to be milled, sanded, ground, etc. The precision and stability of the positional device is important, as is the ability to re-position the positional device. In computerized machinery, the computer needs to know exactly where the work piece is located in order to precisely operate on the work piece. In older machinery, individual components which either located the work piece, or even which were general supports needed to be bolted down, requiring worker intrusion into the work area. Improvements to the work area enabled the use of a vacuum to hold down work piece supports and locators so that they could be more quickly moved or moved using hooks or poles where necessary from outside of the work area. Where the work pieces are not required to be specifically placed, such as a general support, the use of a pole or other distance manual device allows the worker to remain outside of the work area and push the supports about the table. This is very difficult and increases in difficulty where the general supports have significant weight. Even where a general support is only a few pounds, movement across a table can be difficult. If difficult for use with general supports, the precise locator supports simply cannot be manipulated without the operator getting into the work area of the machine. However, movement of the supports or other structures for specific exact placement are virtually impossible to accomplish by a worker from the edge of a work zone.

Even the best method of location, described in issued U.S. Pat. No. 5,562,276, to the inventor herein, discloses the use of an angled device which can be machine located, with a worker placing a vacuum hold down locator against the angled device to insure that the locator is exactly positioned. For this to occur, the worker still must be in a position to visually assure that the locator is precisely located. The vacuum can then be remotely applied to hold the locator down, but where the worker must crawl into the process space each time, the full effectiveness of the use of vacuum hold down during machine set-up is not realizable.

The content of U.S. Pat. No. 5,562,276 is incorporated herein by reference. This was a major advance in machine locator technology, since it enabled the locators to be automatically raised to enable location of the work piece, and automatically lowered to enable work to be done on the work piece. However, the human operator was still required to manually go onto the table to make certain that the locator was positioned precisely on the angled device.

Currently, and especially in the material grinding industry (including glass, granite, marble and the like), a variety of edge configurations are available, with these complex shapes being ground by a router-type spindle which travels around a work piece. The locator of the U.S. Pat. No. 5,562,276 has a pneumatic operator which rises to enable entry of the work piece to a position tangentially abutting a stop surface of the locator device. After locating the work piece by abutting it against a stop surface of the locator, the stop surface is pneumatically lowered to permit grinding work to be done on the work piece. Where a number of runs of the same type of material generally is to be done, the locators can be left in place, raised as the new material is loaded and the stop surface lowered when the material is being processed.

Particularly with machines having larger and more powerful grinding devices and which act upon larger work pieces, the locator devices need to be larger, have larger bases to oppose a tilting force from the work piece as it is being positioned. The need for increased size and more stable work pieces makes physical placement even more onerous. Workers thus spend even more time within the process machinery positioning the material locators, which requires exact location such that the process machinery will register the location of the work piece positioning stop device.

In addition, for different runs of different material, re-positioning of the pneumatic locator devices, regardless of size, requires the precise re-positioning of the locator devices. This precise re-positioning takes significant amounts of time. Given the high cost of the process machinery, loss of time and money occurs during change in setup, making the unit cost of a particular run configuration setup quite high. Lowering the time and effort required in changeover will significantly lower the cost of making short runs of material. The ability to make less expensive short runs is valuable, especially where other cost factors in the distribution channel naturally favor short runs, so long as the short runs are of modest additional cost. Thus the cost savings of short run setup ripple through the vertical distribution system.

The limitation most encountered in process machinery is the limitation of the main robotic member, typically a spindle or rotational driver having little complex robotic capability. The main capability of the main process member relates to its locational ability, rotational orientation locatability and perhaps one or two other control aspects. In the case of material cutting and polishing machinery, for example, the main robotic member has the ability to select tools, rotationally orient to pick up to rotate to grind and also the ability of a single on and off pressurized air source. The manipulability is thus limited. Utilization of the existing robotic translational capability to the greatest extent possible to eliminate the need for workers to enter the work process space is highly desirable. What is therefore needed is a method and device which will harness the existing robotic ability of the process machine to enable placement of position locators precisely, but without costly additional robotic positioning and manipulation equipment.

SUMMARY OF THE INVENTION

The devices and systems of the present invention encompasses both an apparatus and method enabling quick, precise automatic re-positioning of positional devices, particularly useful in edging and milling applications. A clamping holder is capable of automatically approaching, lifting up to surround, engaging and picking up a positioning device, translating to a proper and precise placement location, lowering it into place, disengaging the clamping holder, lowering to provide exit clearance around the positioning device and moving away to either position the next positioning device or to move on to the next task. In addition to this automatic mode, the spindle may also be manually loaded by a worker standing well outside the work area of the main processing machine.

The working spindle carries a spindle shaped clamping holder having a radial side opening to accept the bearing member and piston support of a locational device. Within the clamping holder is a self centering tapered surface to allow the cylindrical shape of the locator bearing member to be exactly centered in the clamping holder when the clamping holder lifts or when the locator downwardly moves within the clamping holder. A single acting, spring opposed, piston clamps down upon the top surface of the cylindrical locator bearing which locks the locator bearing and piston into exact centered alignment with the clamping holder even where the locating member is asymmetrical or where pneumatic hoses place significant lateral forces on the locator. The locator is then translated, using the main working portion of the process machinery, to an exact location where it is placed on the working surface, and unclamped. The clamping holder is then moved downward so that the cylindrical bearing member of the locating device is within the radially located clearance space, and the clamping holder along with the main working portion of the process machinery is moved away from the locator. The clamping holder may be vacuum operated so that it may be fixed solidly to the working surface as soon as it is placed downwardly upon the working table, otherwise the vacuum placement may occur after the clamping holder has moved away from the positioning device. This enables selective remote vacuum fixation to realize its full potential by keeping workers out of the work space, and able to selectively affect placement and vacuum lock down of the positioning devices remotely.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
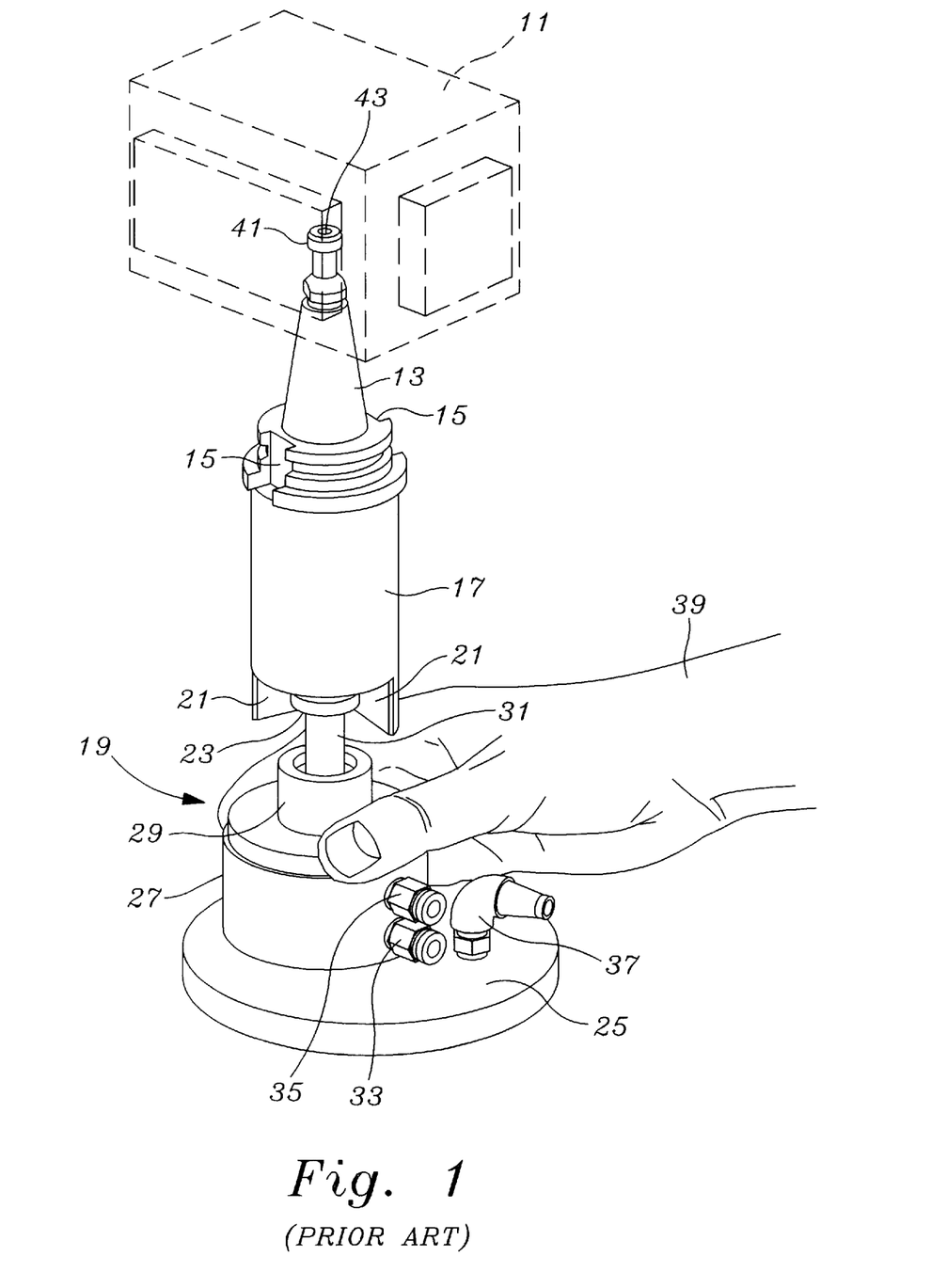
FIG. 1 is a prior art drawing showing a machine operator placing a vacuum locator using an angled block suspended from a working spindle in a glass grinding machine.

The description and operation of the invention will be best described with reference to prior art FIG. 1, which is a perspective view of a process machine worker manually positioning a locator which was described in the U.S. Pat. No. 5,562,276. From the top, a motor unit 11, drawn in phantom, engages a conic tool holder 13 which is used to engage a compatible device at the driving end of the motor unit 11. The conic tool holder 13 has registering notches 15 at opposite sides thereof so that the position of any tool to which it is connected can be registered or keyed to the exact rotational position, typically accomplished by maintaining a constant starting position when taking a tool from a tool rack or by computer input rotational command at a desired moment during the positioning cycle. The conic tool holder 13 shown has 180° rotational symmetry (some tool holders are asymmetrical) and is illustrated to emphasize the need for obtaining an exact angular registration, even where the conic tool holder 13 has such 180° symmetry.

The motor unit 11 is typically located on a motion control device which has the ability to move the motor unit 11 in three dimensions within a defined works space over a table. The location method of FIG. 1 involves the use of an angled locator block 17 being connected to the conic tool holder 13 and with the motor unit 11 being commanded to move to a location where a positional device 19 is to be situated. The angled locator block 17 has a pair of angled surfaces 21 into which an upper bearing member 23 must be exactly positioned, by hand. Once the motor unit 11 has achieved the correct location and height, a worker must crawl into the machine space and manually push the positional device 19 into place with respect to the angled locator block 17.

Once the positional device 19 is located, the worker must crawl out of the work space, and command the motor unit 11 to move to the next location into which the next positional device 19 is to be located. The motor unit 11 must move away from the positional device 19, and is normally raised up rather than attempting to move laterally away since it usually has no angular registration. Raising it avoids tipping the positional device 19 over or moving it forcibly about the table.

The positional device 19 carries a base 25 which may be extremely eccentrically mounted with respect to a base housing 27. A pair of nested piston structures includes an outer piston member 29 and an inner piston member 31 so that the positional device 19 will be able to drop the cylindrical upper bearing member 23 as far down from its maximum height as possible to allow maximum working area for the process operations after setup is achieved. Other features seen on the positional device 19 include a lower pneumatic fitting 33 and an upper pneumatic fitting on the base housing 27, which operate the outer and inner piston members 29 and 31 to an up or down position depending upon which of the fittings 33 and 35 are pressurized. A fitting 37 is located on the base 25 which is used to independently apply vacuum to enable the base 25 and thus the entire positional device 19 to be fixed firmly on any flat working surface within the work area. The vacuum controls are most advantageously located off the working area, and in the configuration of FIG. 1, a worker 39, whose hand is seen in FIG. 1, cannot take full advantage of the remotely located vacuum controls. Any time the worker 39 has to locate himself within the work area, no matter what degree of safety interlocks are applied to the controls, an inherent unsafe condition exists.

All of the fittings 33, 35, and 37 are expected to have quick release connectors at the open end shown to facilitate rapid connection and disconnection of air supply and vacuum supply hoses. Other details of the conic tool holder 13 include an upper land 41 useful for being grasped and manipulated by the motor unit 11. At the center of the land 41 is an air entry port 43 with which the conic tool holder 13 makes air available, if possibly utilizable by any tool which the conic tool holder 13 was interconnected. In the case of machines for cutting and polishing glass, stone, granite and the like, the port 43 is used to supply pressurized air, or liquid coolant, in an on and off or pressurized and non-pressurized state to enable further actuatable control of any tool secured to the conic tool holder 13. The pressurized air input can be used for other purposes, such as clearing the line between tool changes.

Figure 2:
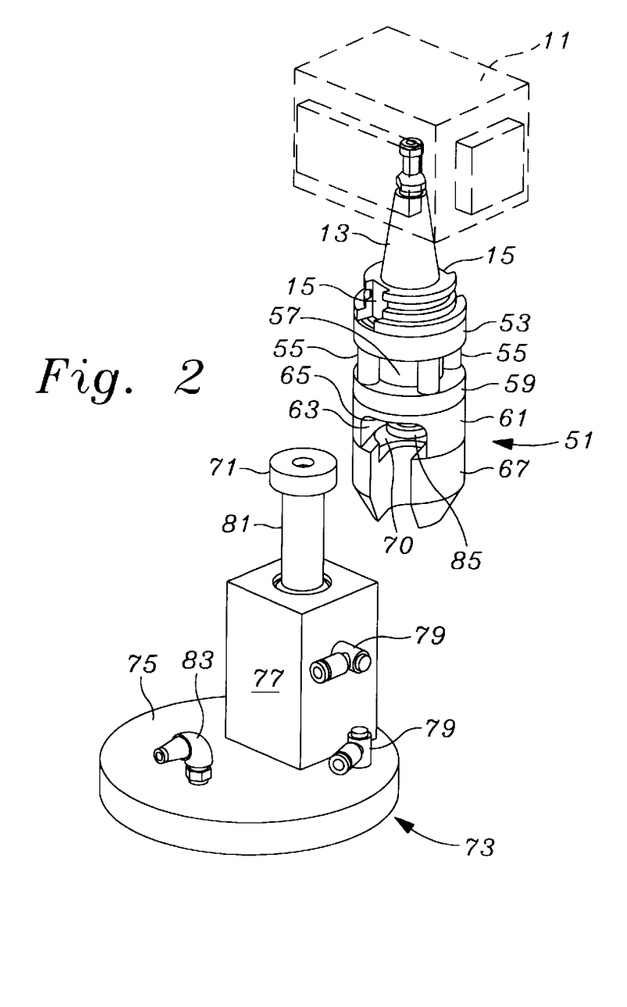
FIG. 2 is a perspective view of a clamping holder of the present invention approaching a cylindrical upper bearing member and piston of a work piece positioning device.

Referring to FIG. 2, a clamping holder 51 is shown in place underneath a conic tool holder 13, the details of the attachment of the clamping holder 51 to the conic tool holder 13 shown later. Clamping holder 51 has a first end abutting the conic tool holder 13 and presenting an almost continuous exterior profile. Clamping holder 51 has a first plate 53 at its first end. Below the first plate 53 are a series of connecting pillars 55 which surround a piston chamber annular ring 57. Both the lower ends of the pillars 55 and bottom of the piston chamber annular ring 57 contact a second plate 59. The pillars 55 join the first plate 53 to the second late 59 and sandwich the piston chamber annular ring 57 therebetween.

Below the second plate 59 is an upper chamber plate 61. Upper chamber plate 61 carries an opening referred to as upper opening 63 which extends toward the center of the upper chamber plate and is the width of the upper chamber 65. Below the upper chamber plate 61 is a lower chamber plate 67 having a lateral opening 69 which is narrower than the maximum width of the upper opening 63, and having an internal lower chamber 70 the purpose being to capture a cylindrical upper bearing member 71 of a work piece positioning device 73.

The positioning device 73 has a base 75, and a heavy duty piston actuator housing 77. Base 75 may be actuated to a stable position through the use of a vacuum or magnets, or the entire base of positioning device 73 may be made of magnetic material, or the base of positioning device 73 may be an electromagnet. Fittings 79 operate the lowering and raising of a piston rod 81. Fitting 83 can be used where the base 75 is a vacuum base with a sealing ring, to accept a vacuum hose to deliver a vacuum supply to the positioning device 73. Where the base 75 supports an electromagnet, the fitting 83 can be used to run wires to power the electromagnet. In this configuration, the same fitting 83 can be used for both. In cases where the base 75 is itself a permanent magnet, the fitting 83 may be eliminated entirely. Whether magnetic or vacuum or other holding force, there must be enough downward force to oppose the loading of work pieces into the work area.

The motor unit 11 may approach a positioning device 73 with its piston rod 81 fully extended, at a level, and from a direction relative to the rotation of the clamping holder 51 which will orient the lateral opening of the combined openings 69 and 63 to capture the upper bearing member 71 and piston rod 81 within the upper chamber 63 and an upper portion of the lower chamber 70. Care must be used when using a 180° rotational symmetry holder such as conic tool holder 15 to insure that the clamping holder 51 achieves the exact rotational orientation. Also seen in FIG. 2 is a clamping disk 85 which will be used to apply downward force to, and abut the top of the cylindrical upper bearing member 71, to insure that the cylindrical upper bearing member 71 is securely locked within the clamping holder 51.

Figure 3:
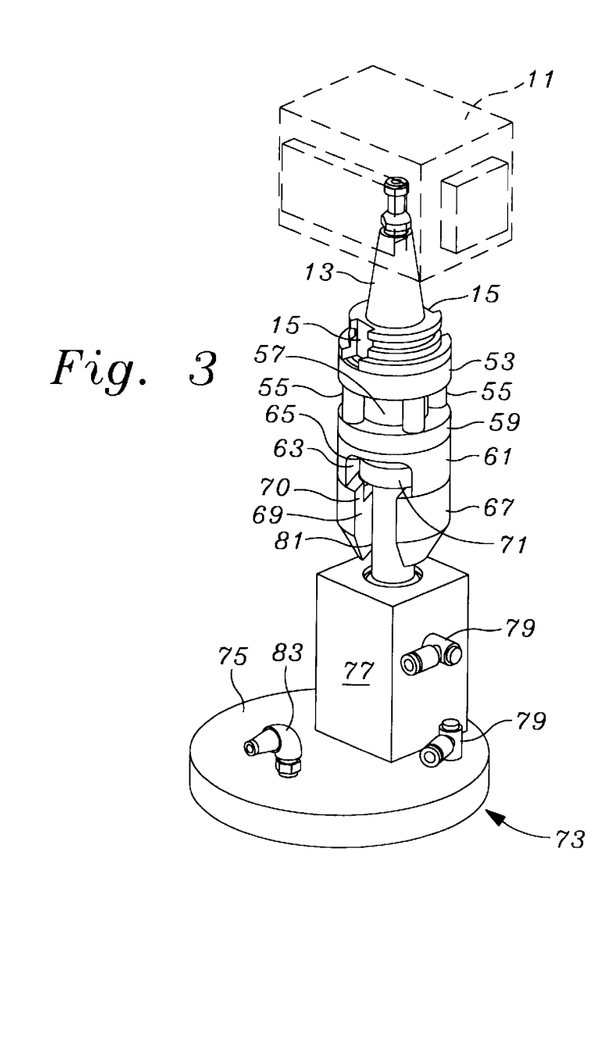
FIG. 3 is a perspective of the completion of the approach of FIG. 2 in which the cylindrical upper bearing member is captured within an upper chamber of the clamping holder.

The initial position of capture is shown in FIG. 3. In FIG. 3, the cylindrical upper bearing member 71 resides within the upper chamber 65 and upper portion of the lower chamber 70, but ideally will not touch any of the internal walls of the clamping holder 51. To complete the capture, two other steps need to occur, and they may occur in any order as needed. First, the clamping holder 51 will need to be lifted upwardly to cause the cylindrical upper bearing member 71 to move down into the lower most extent of the lower chamber 70. Lower chamber 70 is frusto-conically shaped with a sectionally appearing tapered surface which automatically centers the cylindrical upper bearing member 71 with respect to the center line of the clamping holder 51. Secondly, the clamping disk 85 is brought down to bear on the top of the cylindrical upper bearing member 71 to insure that cylindrical upper bearing member 71 stays locked into place at the bottom of the lower chamber 70 and cannot move in any direction with respect to the clamping holder 51. Thereafter, the motor 11, conic tool holder 13 and clamping holder 51 can continue to lift the work piece positioning device 73 to any other position on the work table.

This procedure is especially useful where the computer controller for the motor unit 11 is electronically aware of the position of the work piece positioning device 73, as well as the fact that the piston 81 is in fully extended position. In instances where the main process machine is being set up initially, it is much easier to bring the motor unit 11 to the front of the work space, with the clamping holder 51 in an elevated position, and simply have a worker manually enter the cylindrical upper bearing member 71 of the work piece positioning device 73 into the clamping holder 51. In this case, the only additional step is to actuate the clamping disk 85 to hold the clamping holder 51 solidly in place and then have the motor unit 11 move the clamping holder 51 to an exact position desired and then decouple. This can be done with a series of simple and programmable computer input codes.

The decoupling procedure has one or two more subtleties which relate to downward placement of the clamping holder. Preferably, and as will be shown, the clamping disk 85 will be pneumatically actuated through pressure applied to the air entry port 43 and thus the force applied to the clamping disk 85 will be subject to compression depending upon the pressure at air entry port 43. While the unit is being placed down, it is preferable that air be introduced through one of the fittings 79 which is connected to extend the piston 81 to insure that the piston 81 remains fully extended during the downward implacement operation. This also gives a degree of spring in the piston 81. Preferably, the upward force on the piston 81 should be greater than the downward force on the clamping disk 85, but in any case, the downward motion of the motor unit 11 and contact of the work piece positioning device 73 will be cushioned by the pneumatic forces against clamping disk 85 and piston 81. This prevents the motor unit 11 from driving the work piece positioning device 73 through the table if the tollerancing capability of the motion controller exceeds its clearance. In addition, the clamping holder 51 of the present invention gives another capability, that of pressing the work piece positioning device 73 down onto the table just before a vacuum is applied to the fitting 83, or before the electromagnet in the base 75 is actuated through current applied to an electromagnet. In fact, the holding force through either vacuum or magnet can be applied during the time the motor unit 11 is exerting downward force on the clamping holder 51 so as to insure that the work piece positioning device 73 stays exactly where it is placed. This insures the ability to retrieve it later on.

Once the holding force through vacuum or magnet is applied (if it is applied), the clamping disk 85 is lifted to provide clearance in the upper chamber 65 for the cylindrical upper bearing member 71 to move upwardly within it, and then escape from the upper opening 63. During this time, the pneumatic pressure urging piston 81 to the fully extended position should be continued. The motor unit 11 is then lowered, lowering the clamping holder 51 to a level where the upper chamber 65 surrounds the cylindrical upper bearing member 71, and the upper opening 63 is before cylindrical upper bearing member 71. The motor unit 11 and the clamping holder 51 then move in a direction away from upper opening 63 to enable cylindrical upper bearing member 71 to move evenly through the center of the upper opening until the clamping holder has moved away from the cylindrical upper bearing member 71 and work piece positioning device 73, thus completing the placement of the work piece positioning device 73. In cases where a permanent magnet base 75 is used, the deactivation of the holding force is not necessary so long as the motor unit 11 has enough force and power to lift the work piece positioning device 73.

Figure 4:
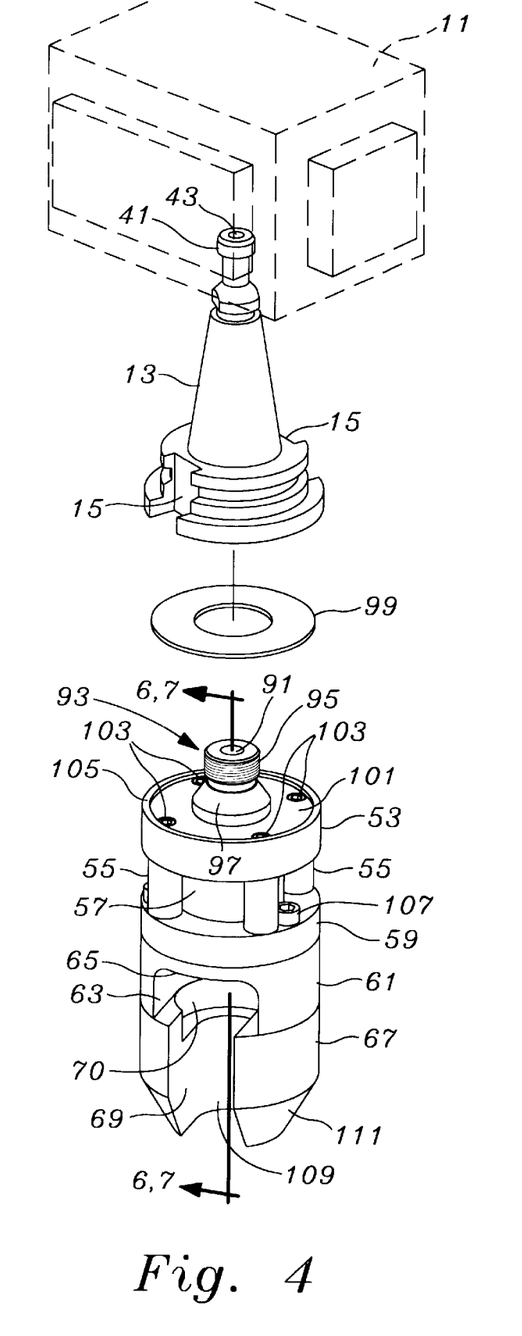
FIG. 4 is a partially exploded view of the clamping holder of the invention separated from a conic tool holder and showing details of the attachment to the conic tool holder.

Referring to FIG. 4, a view of the clamping holder 51 apart from the conic tool holder 13 shows details of connection. The inlet air port 43 communicates with an inlet air port 91 of a threaded boss 93 which is preferably continuous with the first plate 53. On the boss 93, an upper set of threads 95 overlies a conical locating surface 97 which is used to center the clamping holder 51 with respect to the conic tool holder 13. Preferably a locking device is used to precisely set the rotational relationship of the clamping holder 51 with respect to the conic tool holder 13 to insure that precision in rotational position of the conic tool holder 13 will translate to the clamping holder 51. Since the forces between the clamping holder 51 and the conic tool holder 13 should occur at the conical locating surface 97, a soft rubber gasket 99 is provided to seal out any debris which might fall atop an upper surface 101 of first plate 53.

Also seen atop the upper surface 101 is a series of threaded screws 103 which lie just inside a very shallow lip 105. The screws extend through the connecting pillars and into the second plate 59 to hold the upper portion of the clamping holder 51 together. Atop the second plate 59, a bolt head 107 is seen which is used to secure the second plate to the lower chamber plate 67 and sandwich the upper chamber plate 61 therebetween.

Further details of the clamping holder 51 are seen including the lateral opening 69 and its continuity to form a lower opening 109, as well as a lower beveled surface 111.

Figure 5:
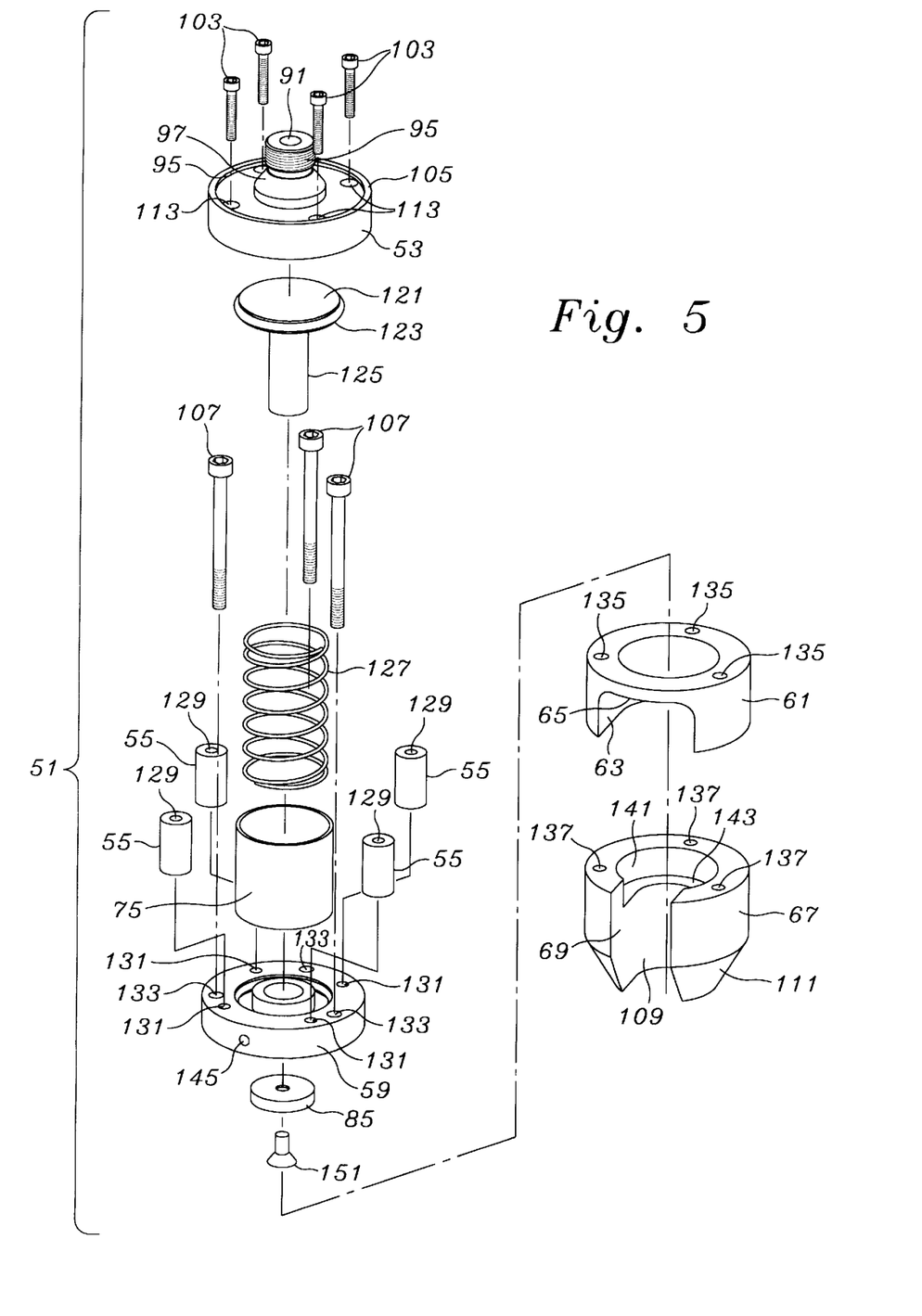
FIG. 5 is a completely exploded view showing the illustrative component parts of the clamping holder of the invention.

Referring to FIG. 5, an exploded view of the clamping holder illustrates further details of construction. From the top, the threaded screws 103 can be seen passing through upper bores 113. Below the first plate 53, an abbreviated axial length piston 121 is seen surrounded by an "o" ring 123 which is held in a radially outwardly disposed groove (not directly seen in FIG. 5). The piston 121 is connected to a piston rod 125. The piston rod 125 fits through a coil spring 127 to enable the piston 121 to operate as a single side single action piston with actuating force coming through air pressure from above and return force coming through spring action bearing from below. Piston chamber annular ring 57 is provided for the piston 121 to act within, to contain spring 127, and to keep debris out of the internal assembly.

Four of the connecting pillars 55 can be seen and which act to stabilize and space apart the first and second plates 53 and 59. The threaded screws 103 extend through bores 129 in the pillars 55 to then engage threaded apertures 131 into the top of second plate 59. Through bores 133 in second plate 59 accommodate the bolts 107. Through bores 133 align with through bores 135 of the upper chamber plate 61. The through bores 135 of the upper chamber plate 61 align with threaded bores 137 in the lower chamber plate 67. This sandwiches the upper chamber plate 61 between the second plate 59 and the lower chamber plate 67.

In the lower chamber plate 67, the lower chamber 70 has a tapered wall 141 on the side, bounded by a radial groove 143. The radial groove bears against the lower surface of the periphery of the cylindrical upper bearing member 71 of the work piece positioning device 73.

Also seen is an exhaust port 145 communicates through a point within the piston chamber annular ring 57, to enable air to breathe in and out of the space below the piston 121. Also seen is a threaded screw 151 which secures the clamping disk 85 to the bottom of piston rod 125. The bottom of piston rod 125 contains a threaded bore (not seen) to securely attach the clamping disk 85 to the piston rod 125.

Figure 6:
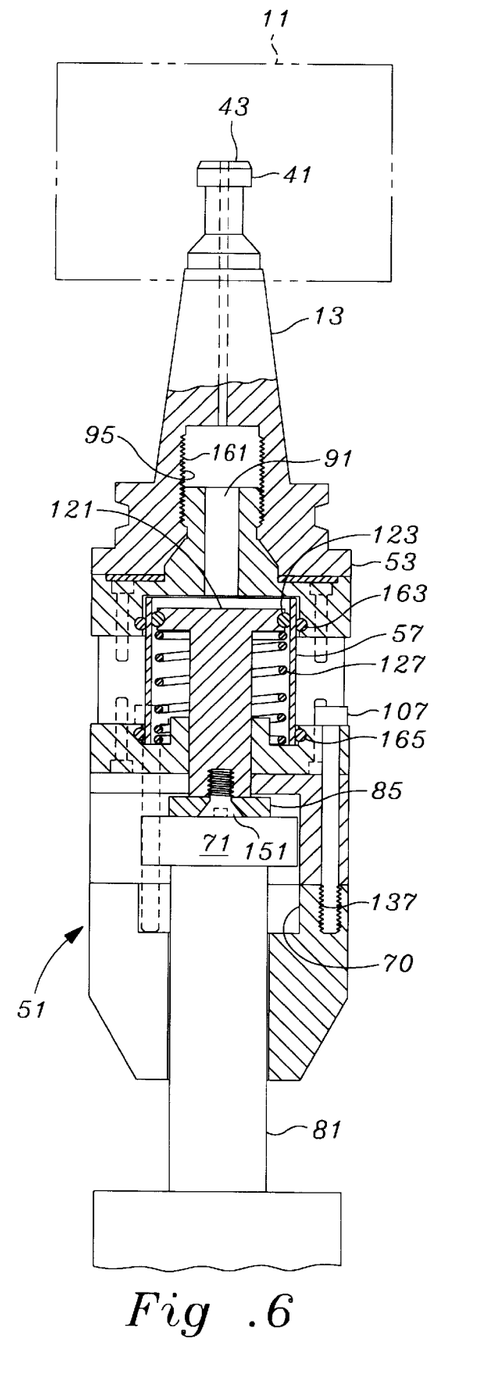
FIG. 6 is a side sectional view with greater detail of the inside of the clamping holder and shown in a position having just captured the cylindrical upper bearing member of a work piece positioning device.
Figure 7:
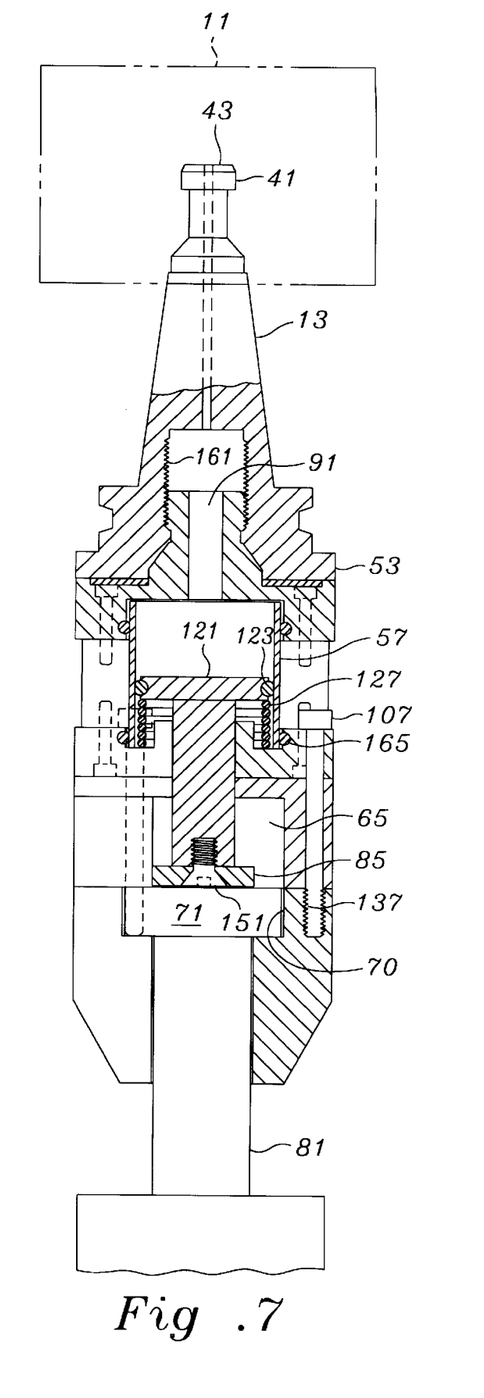
FIG. 7 is a view in accord with FIG. 6 but where the piston is actuated downward and where the cylindrical upper bearing member of a work piece positioning device is forced into its frusto-conical centering lower chamber and where the work piece positioning device is centered with respect to the clamping holder.

Referring to sectional FIGS. 6 and 7 further details are seen, and the action within the clamping holder 51 is illustrated. From the top, conical tool holder 13 has an internally threaded surface 161 which engages thread 95. The piston chamber annular ring 57 is sealed with respect to first plate 53 by a first outer "o" ring 163, and sealed with respect to second plate 59 by a second outer "o" ring 165. The spring 127 is shown in the extended position with piston 121 at its upper position and cylindrical upper bearing member 71 having been just captured by the clamping holder 51, in a position as seen in FIG. 4.

Referring to FIG. 7, the spring 127 is shown in the compressed position with piston 121 at its lower position after the introduction of pressurized air into the inlet air port 91 which pushes piston 121 down. Cylindrical upper bearing member 71 is now forced by the clamping disk 85 into the lower chamber 70 having tapering side walls 141 which force the member 71, and its work piece positioning device 73 to be centered exactly with respect to the clamping member 51. Since the motion control machinery may produce forces greater than the forced produced by pneumatic pressure in either the clamping member 51 or the positioning device 73, it is desirable for the downward pressure on the piston 121 to be applied while the motor unit 11 is raised so that the movements may be more fluid and precisely assured.

One consideration which should be addressed is the radial registration of the clamping holder 51 to the conic tool holder 13. This can be accomplished by several methods. In one, the threaded connection between the clamping holder 51 and the conic tool holder 13 is simply tightened to the maximum extent, and then the radial position of the openings 69 and 93 is simply registered with the controls for the process machinery which directs motor unit 11 about the work area. Another way is to provide a locking structure which can be aligned and engaged after sufficient force has been brought to bear on the conical locating surface 97. In addition to registering the radial position of the openings 69 and 93, the locking mechanism would prevent any detachment between the clamping holder 51 and the conic tool holder 13, although with such insignificant torque in the operation of the clamping holder 51, disengagement is not expected to be a problem. Other mechanisms could be used to split the first plate into two plates, an upper first plate to be highly torqued to the conic tool holder 13 and a lower first plate to be registered with set screws or the like to the upper first plate. Other mechanism are possible, and too numerous to adequately treat here.

While the present invention has been described in terms of a device and system used in conjunction with all types of process machinery, and in particular with machinery for the milling, edging and machining of materials including glass, granite, marble, stone, and the like, one skilled in the art will realize that the structure and techniques of the present invention can be applied to many appliances. The present invention may be applied in any situation where the position of components are desired to be precisely located and to avoid operators having to enter the work process area of a manufacturing system to increase safety, and to reduce lost time.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A clamping holder for transporting and placing a device having an upper member comprising:

a body having a first end having an attachment structure, and a second end having a chamber having an end opening in the direction of said second end and a lateral opening coextensive with said end opening for accepting an upper member of a device within said chamber, and wherein said chamber has a first portion having a cylindrical internal shape, and a second portion, nearer said second end than said first portion, having a frusto-conical shape and tapering in the direction of said second end; and an actuation member having a bearing end and forcibly urgeable into said chamber in the direction of said second end to urge said upper member in the direction of said second end.

2. The clamping holder as recited in claim 1 wherein said chamber has a maximum width matching a maximum width of said lateral opening.

3. The clamping holder as recited in claim 1 wherein said bearing end of said actuation member has an end area greater than a cross sectional area of said actuation member to provide an expanded area of bearing within said chamber.

4. The clamping holder as recited in claim 1 wherein said chamber has a groove, generally perpendicular to a length between said first and said second ends of said body for providing upward bearing force on said upper member in a direction opposing said bearing end of said actuation member.

5. The clamping holder recited in claim 1 wherein said device has a vacuum actuated base capable of vacuum sealed placement on a surface and wherein said device can be independently vacuum actuated to enable vacuum actuation while said actuation member bearing end is urged downwardly upon said upper member.

6. The clamping holder recited in claim 1 wherein said device has an electromagnetically actuated base capable of fixable placement on a surface and wherein said device can be independently electromagnetically actuated to enable fixation to said surface while said actuation member bearing end is urged downwardly upon said upper member.

7. The clamping holder as recited in claim 1 wherein said actuation member is a pneumatically actuated member and wherein said body has a pneumatic opening in communication with said pneumatically actuated member.

8. The clamping holder recited in claim 7 wherein said pneumatically actuated member is a piston, and further comprising:

a piston chamber within said housing;

a piston rod having a first end connected to said piston having a second end at said bearing end of said actuation member.

9. A clamping holder for transporting and placing a device having an upper member comprising:

a body having a first end having an attachment structure, and a second end having a chamber having an end opening in the direction of said second end and a lateral opening coextensive with said end opening for accepting an upper member of a device within said chamber; and an actuation member having a bearing end and forcibly urgeable into said chamber in the direction of said second end to urge said upper member in the direction of said second end, and wherein said actuation member is a pneumatically actuated member and wherein said body has a pneumatic opening in communication with said pneumatically actuated member.

10. The clamping holder recited in claim 9 wherein said pneumatically actuated member is a piston, and further comprising:

a piston chamber within said housing;

a piston rod having a first end connected to said piston having a second end at said bearing end of said actuation member.

11. The clamping holder as recited in claim 9 wherein said chamber has a first portion having a cylindrical internal shape, and a second portion, nearer said second end than said first portion, having a frusto-conical shape and tapering in the direction of said second end.

12. The clamping holder as recited in claim 9 wherein said chamber has a maximum width matching a maximum width of said lateral opening.

13. The clamping holder as recited in claim 9 wherein said bearing end of said actuation member has an end area greater than a cross sectional area of said actuation member to provide an expanded area of bearing within said chamber.

14. The clamping holder as recited in claim 9 wherein said chamber has a groove, generally perpendicular to a length between said first and said second ends of said body for providing upward bearing force on said upper member in a direction opposing said bearing end of said actuation member.

15. The clamping holder recited in claim 9 wherein said device has a vacuum actuated base capable of vacuum sealed placement on a surface and wherein said device can be independently vacuum actuated to enable vacuum actuation while said actuation member bearing end is urged downwardly upon said upper member.

16. The clamping holder recited in claim 9 wherein said device has an electromagnetically actuated base capable of fixable placement on a surface and wherein said device can be independently electromagnetically actuated to enable fixation to said surface while said actuation member bearing end is urged downwardly upon said upper member.

17. A clamping holder for transporting and placing a device comprising:

a body having a first end having an attachment structure, and a second end having a chamber having an end opening in the direction of said second end and a lateral opening coextensive with said end opening;

a piston within a piston chamber within said body;

a piston rod having a first end connected to said piston and a second end extendable into said chamber upon actuation of said piston in the direction of said second end; and a spring having a first end engaging said body and a second end engaging said piston to urge said piston away from said chamber.

* * * * *